United States Patent
Weng et al.

(10) Patent No.: US 11,361,080 B2
(45) Date of Patent: Jun. 14, 2022

(54) REDUCING THE SECURE BOOT TIME OF FULL NETWORK OPERATING SYSTEM IMAGES USING A COMBINATION OF PARTITIONING, STAGING AND AMORTIZED VERIFICATION TECHNIQUES

(71) Applicant: Cisco Technology Inc., San Jose, CA (US)

(72) Inventors: Wenwei Weng, Milpitas, CA (US); Nag Avadhanam, Cupertino, CA (US); Xiaoguang Jason Chen, San Jose, CA (US); Ning Zhao, Cupertino, CA (US); Christopher A. Stone, Quebec (CA)

(73) Assignee: CISCO TECHNOLOGY, INC., San Jose, CA (US)

( * ) Notice: Subject to any disclaimer, the term of this patent is extended or adjusted under 35 U.S.C. 154(b) by 250 days.

(21) Appl. No.: 16/846,891

(22) Filed: Apr. 13, 2020

(65) Prior Publication Data
US 2021/0319109 A1    Oct. 14, 2021

(51) Int. Cl.
*G06F 21/57*     (2013.01)
*G06F 8/61*      (2018.01)
(Continued)

(52) U.S. Cl.
CPC .............. *G06F 21/575* (2013.01); *G06F 8/63* (2013.01); *G06F 21/577* (2013.01);
(Continued)

(58) Field of Classification Search
CPC ........ G06F 21/575; G06F 8/63; G06F 21/577; G06F 21/602; G06F 21/64; G06F 21/78
See application file for complete search history.

(56) References Cited

U.S. PATENT DOCUMENTS 6,490,722 B1 * 12/2002 Barton ................. H04N 9/8042
                                                348/E5.103
6,938,127 B2    8/2005 Fletcher et al.
(Continued)

OTHER PUBLICATIONS

PCT Notification of Transmittal of the International Search Report and the Written Opinion of the International Searching Authority, or the Declaration; International Application No. PCT/US2021/025700; 11 pages; dated Jun. 28, 2021.

*Primary Examiner* — Ayoub Alata
(74) *Attorney, Agent, or Firm* — Baker Botts, LLP

(57) ABSTRACT

The present disclosure is directed to reducing the secure boot time of software images and includes one or more processors and one or more computer-readable non-transitory storage media coupled to the one or more processors and comprising instructions that, when executed by the one or more processors, cause one or more components to perform operations including identifying a software image for a first secure boot, the software image stored in a persistent storage and comprising a kickstart software package and a system software package, fetching the software image, including the kickstart software package and the system software package, from the persistent storage to a memory, verifying one or more digital signatures associated with the software image, booting the kickstart software package of the software image from the memory, and staging the system software package in the persistent storage.

14 Claims, 4 Drawing Sheets

(51) Int. Cl.
  *G06F 21/60* (2013.01)
  *G06F 21/64* (2013.01)
  *G06F 21/78* (2013.01)

(52) U.S. Cl.
  CPC ............ *G06F 21/602* (2013.01); *G06F 21/64* (2013.01); *G06F 21/78* (2013.01)

(56) References Cited

U.S. PATENT DOCUMENTS

| | | | |
|---|---|---|---|
| 8,784,195 B1 * | 7/2014 | Crowder, Jr. | H04L 9/3247 |
| | | | 463/19 |
| 9,274,804 B2 | 3/2016 | Gillespie et al. | |
| 10,019,252 B1 * | 7/2018 | Cui | G06F 8/654 |
| 10,592,254 B2 | 3/2020 | Poornachandran et al. | |
| 10,599,442 B2 | 3/2020 | Packer Ali et al. | |
| 2011/0283098 A1 * | 11/2011 | Gillespie | G06F 9/4401 |
| | | | 713/2 |
| 2013/0091345 A1 * | 4/2013 | Shroff | G06F 21/575 |
| | | | 713/2 |
| 2015/0058839 A1 * | 2/2015 | Madanapalli | G06F 8/656 |
| | | | 718/1 |
| 2017/0344354 A1 * | 11/2017 | Schiefelbein | G06F 8/61 |
| 2017/0372074 A1 * | 12/2017 | Gunti | G06F 21/575 |
| 2019/0042583 A1 * | 2/2019 | Tierney | G06F 16/10 |
| 2020/0089507 A1 | 3/2020 | Froehlich et al. | |

\* cited by examiner

REDUCING THE SECURE BOOT TIME OF FULL NETWORK OPERATING SYSTEM IMAGES USING A COMBINATION OF PARTITIONING, STAGING AND AMORTIZED VERIFICATION TECHNIQUES

TECHNICAL FIELD

The present disclosure generally relates to systems and methods for reducing the secure boot time of full network operating system images, and more specifically to systems and methods for reducing the secure boot time of full network operating system images using a combination of automatic image partitioning and amortized cryptographic verification strategies.

BACKGROUND

With the arrival of Internet of Things (IOT) devices and digital enterprises, networking devices are being deployed in places like vehicles, factories, and mission-critical enterprises. In many cases, the networking device needs to be up and running as quickly as possible in order to provide the network service. In conventional systems, the secure boot of a software image inevitably increases the device boot-up time.

DESCRIPTION OF EXAMPLE EMBODIMENTS

Overview

Figure 1:
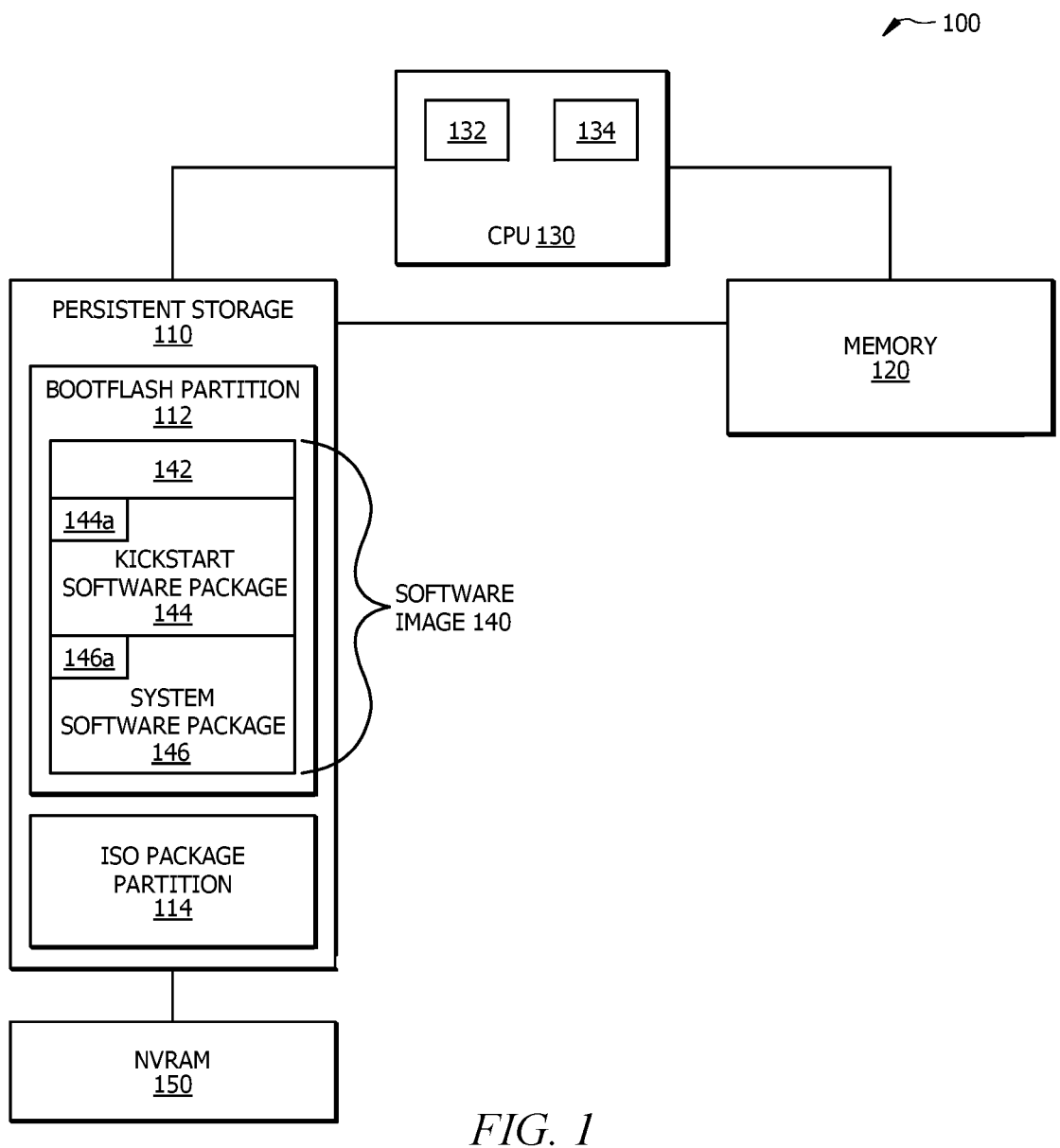
FIG. 1 illustrates a system for reducing the secure boot time of a software image, in accordance with certain embodiments.

According to an embodiment, a system may include one or more processors and one or more computer-readable non-transitory storage media comprising instructions that, when executed by the one or more processors, cause one or more components of the system to perform operations including, identifying a software image for a first secure boot, the software image stored in a persistent storage and comprising a kickstart software package and a system software package, fetching the software image, including the kickstart software package and the system software package, from the persistent storage to a memory, verifying one or more digital signatures associated with the software image, booting the kickstart software package of the software image from the memory, and staging the system software package in the persistent storage.

The operation of staging may further include transferring the system software package from the memory to a partition of the persistent storage, and writing a filename associated with the software image in a non-volatile memory.

Additionally, the operations may include storing hash information associated with the system software package in the partition of the persistent storage.

Moreover, the operations may include identifying the software image for a subsequent secure boot, determining, based on a look-up of the filename associated with the software image, that the system software package of the software image is staged in the persistent storage, and fetching the kickstart software package from the persistent storage to the memory. The operations may further include verifying a digital signature of the kickstart software package, booting the kickstart software package, verifying the hash information associated with the system software package, and booting the system software package from the persistent storage. The hash information may be verified using asymmetric cryptography.

Additionally, the operations may include creating a device mapper to establish a running context using the verified hash information associated with the system software package.

According to another embodiment, a method may include the steps of identifying a software image for a first secure boot, the software image stored in a persistent storage and comprising a kickstart software package and a system software package, fetching the software image, including the kickstart software package and the system software package, from the persistent storage to a memory, verifying one or more digital signatures associated with the software image, booting the kickstart software package of the software image from the memory, and staging the system software package in the persistent storage.

According to yet another embodiment, one or more computer-readable non-transitory storage media may embody instructions that, when executed by a processor, cause the performance of operations, including identifying a software image for a first secure boot, the software image stored in a persistent storage and comprising a kickstart software package and a system software package, fetching the software image, including the kickstart software package and the system software package, from the persistent storage to a memory, verifying one or more digital signatures associated with the software image, booting the kickstart software package of the software image from the memory, and staging the system software package in the persistent storage.

Technical advantages of certain embodiments of this disclosure may include one or more of the following. The systems and methods described herein may allow for the pre-staging of the system software package of a software image during a first boot, so that when the software image is booted a subsequent time, the secure boot time may be reduced by a significant amount. Specifically, by pre-staging the system software package of a software image during a first boot, the user may avoid certain time-consuming processes in a subsequent secure boot, including moving the system software package of the software image from persistent storage into a memory, verifying the whole software image, and then moving the system software package back onto the persistent storage, thereby reducing the overall secure boot time.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

A bootable network operating system (NOS) software image may generally consist of two sections or packages: 1) a smaller kickstart software package (i.e., a bootable package that may include the kernel and the initial random access memory (RAM) file system, comprising less than 5% of the whole image); and 2) a larger system software package (i.e., a set of discrete packages containing application binaries and configuration files that implement the system functionally). Conventional methods for booting the NOS software image (whether a first-time boot or a subsequent boot) involve a series of time-consuming steps that require processing the whole software image, i.e. both the kickstart software package and the system software package. For example, a conventional method may include the steps of retrieving the entire software image from a persistent storage location; writing the whole software image onto a memory; verifying the whole software image based on its image signature; booting the kickstart software package from the memory; writing the system software section back on the persistent storage location (to avoid taking up valuable space in memory); and booting the rest of the image. Because the whole software image must be retrieved, written, verified, re-written, etc., the process is tedious, and the secure boot time may be lengthy.

FIG. 1 depicts a system 100 for reducing the secure boot time of a NOS software image, in accordance with the present disclosure. To begin, FIG. 1 shows a NOS software image 140 (referred to throughout this disclosure as a "software image"), which may be securely booted by system 100. As discussed above, software image 140 may include a kickstart software package 144, which is a smaller package comprising a small fraction of the software image 140, and a system software package 146, which is a larger package comprising the bulk of the software image 140. The system software package 146 may comprise a single package or a plurality of component packages. The system software package 146 of FIG. 1 shows a single package.

Software image 140 may also include a header 142. Likewise, the kickstart software package 144 may include header 144a, and the system software package 146 may include header 146a. During the build process of the software image 140, hash information (specifically, cryptographic hashes, such as Merkle tree of hashes) relating to the software image 140 may be computed, signed and embedded inside the software image 140. In an embodiment, the signed hash information may be stored inside the header 144a of the kickstart software package 144 and/or the header 146a system software package 146 and may verified at subsequent boots. The signed hash information which may be verified at subsequent boots may comprise information computed in accordance with standard asymmetric cryptography. Moreover, the entire software image 140 may include a digital signature, and each individual package 144, 146 may also include a digital signature. While FIG. 1 shows software image 140 stored in a bootflash partition 112 of the persistent storage 110, it is to be understood that the location of software image 140 in FIG. 1 is for illustration purposes only. As described in detail below, software image 140 may initially be stored in the bootflash partition 112 of the persistent storage 110, may be written into memory 120, and then may be transferred back to ISO package partition 114 of the persistent storage 110 in accordance with various embodiments.

System 100 may include a persistent storage 110, a memory 120, and a central processing unit (CPU) 130. Persistent storage 110 may constitute, by way of example, an embedded Multi Media Controller (eMMC) flash memory, a hard drive, a USB flash memory, or any other persistent storage device known in the art. Persistent storage 110 may include one or more partitions, including a bootflash partition 112 and an ISO package partition 114. The bootflash partition 112 of the persistent storage 110 may be used to initially store a software image 140 that has been identified for a secure boot. The ISO package partition 114 may be used to store and/or stage the system software package 146, as described below. Moreover, while the ISO package partition 114 is depicted as a single partition, in some embodiments, it may be sub-partitioned into multiple smaller partitions, wherein one or more sub-partitions may be used to stage the system software package 146 and one or more sub-partitions may be used to store root hash information.

System 100 may further include a memory 120, which may comprise a Random Access Memory (RAM), such as Synchronous Dynamic Random Access Memory (SDRAM), Double Data Rate 4 Synchronous Dynamic Random-Access Memory (DDR4-SDRAM), or any other type of memory known in the art. In an embodiment, a software image 140 and/or its constituent components 142, 144, 146 fetched from persistent storage 110 may be written into memory 120. System 100 may further include a non-volatile memory 150 communicatively coupled and/or associated with persistent storage 110.

Finally, system 100 may include a CPU 130 for communicating with the persistent storage 110 and the memory 120, and/or instructing the system 100 with respect to the processes relating to the secure boot, as described herein. CPU 130 may include a boot loader module 132 and a running kickstart module 134.

In operation, when a software image 140 is identified for a secure boot for the first time, the boot loader module 132 may fetch the software image 140 in its entirety from persistent storage 110, where it is being stored, into memory 120. More specifically, the software image 140 may be fetched from the bootflash partition 112 of the persistent storage 110 into memory 120. It is to be understood that the term "fetch" is used in the art to describe the process of retrieving data and then moving it to an alternate location. Here, the software image may be moved from persistent storage 110 to memory 120.

Next, boot loader module 132 may perform a digital signature verification of the entire software image 140 from memory 120. By verifying the digital signature of the software image 140, the validity of the software image 140 may be confirmed. If the digital signature of the software image 140 is successfully verified, the running kickstart module 134 may boot the kickstart software package 144 of the software image 140. Then, since the software image 140 has been fully verified, the running kickstart module 134 may "stage" the system software package 146 (which may be organized as a set of discreet SquashFS packages) on the ISO package partition 114 of the persistent storage 110. The ISO package partition 114 may be set up as a device mapper (DM) verity target partition. The process of "staging" may include the steps of: copying the system software package 146 of the software image 140 from memory 120 to the ISO package partition 114 of the persistent storage 110, and writing a filename associated with the software image 140 in a non-volatile memory location 150, e.g., a non-volatile random access memory (NVRAM). In an embodiment, the filename may be written in a Serial Peripheral Interface (SPI) flash. The filename may serve to indicate upon subsequent boots that the system software package 146 of this software image 140 has been successfully staged on the ISO package partition 114.

Next, the hash information that was stored in the header 144a of the kickstart software package 144 and/or the header 146a of the system software package 146 may be copied and stored in the ISO package partition 114 in the persistent storage 110. This may ensure that on subsequent boots, the system software package 146 may be accessed with a cryptographic guarantee that any modifications may be detected without requirement of a full verification.

Then, the software image 140, specifically, the system software package 146, may then proceed to boot normally (as the kickstart software package 144 has already booted from memory, as described above). This initial boot may take a few seconds longer than conventional boot times due to the staging of the system software package 146 in the ISO package partition 114. However, because the system software package 146 has now been staged on the ISO package partition 114, the boot time of any subsequent secure boot of the software image 140 will be significantly reduced.

When the software image 140 is identified for a subsequent boot, the system 100 may undergo the following steps. First, the boot loader module 132 may determine whether the system software package 146 of the software image 140 has already been staged in the persistent storage 110, and more specifically, in the ISO package partition 114 of the persistent storage 110. The boot loader module 132 may make this determination by looking up the filename of the software image 140 in the NVRAM 150. If a match is found, the boot loader module 132 may fetch only the kickstart software package 144 from the bootflash partition 112 of the persistent storage 110 to memory 120. The boot loader module 132 may then perform a digital signature verification on only the kickstart software package 144 of the software image 140. Since the kickstart software package 144 is typically a small fraction of the whole software image 140, the foregoing steps (e.g., fetching only the kickstart software package 144 and verifying the digital signature of only the kickstart software package 144) may substantially reduce the secure boot time of the software image 140.

After the boot loader module 132 verifies the kickstart software package 144, it may pass a flag to the running kickstart module 134, so that when the running kickstart module 134 boots the kickstart software package 144, it will know that the system software package 146 has been staged on the ISO package partition 114. The running kickstart module 134 may then boot the kickstart software package 144. Once the kickstart software package 144 has been booted from memory 120, the integrity of the system software package 146 stored on the ISO package partition 114 may be determined. Because the software image 140 was fully verified at the first boot, this subsequent verification of the system software package 146 may simply include verifying the hash information stored on the ISO package partition 114. Specifically, the running kickstart module 134 may verify the hash information using the root hash (which is a sum) of the hash information, based on methods of asymmetric cryptography, as known in the art. Because the subsequent cryptographic verification does not require full verification of the software image 140, the verification may be termed "amortized", as only sections of the software image 140 are verified at a time.

If the hash information of the system software package 146 is verified, the running kickstart module 134 may use the root hash to create a device mapper, which may then be used by the operating system to mount the image. In an embodiment, the device mapper may comprise a Linux driver, such a DM Verity. In some embodiments, the running kickstart module 134 may establish a running context for the system software package 146 using the device mapper which may use the verified hash information and/or root hash to map information such as start locations, block sizes used, etc. of the staged system software package 146. Then, the system software package 146 may proceed to secure boot fully. By pre-staging the system software package 146 of the software image 140 in the ISO package partition 114, the system 100 may avoid the time-consuming process of moving the large and bulky system software package 146 of the software image 140 from persistent storage 110 into the memory 120, and then back onto the persistent storage 110 again every time the software image 140 image is booted, thereby reducing the secure boot time.

Figure 2:
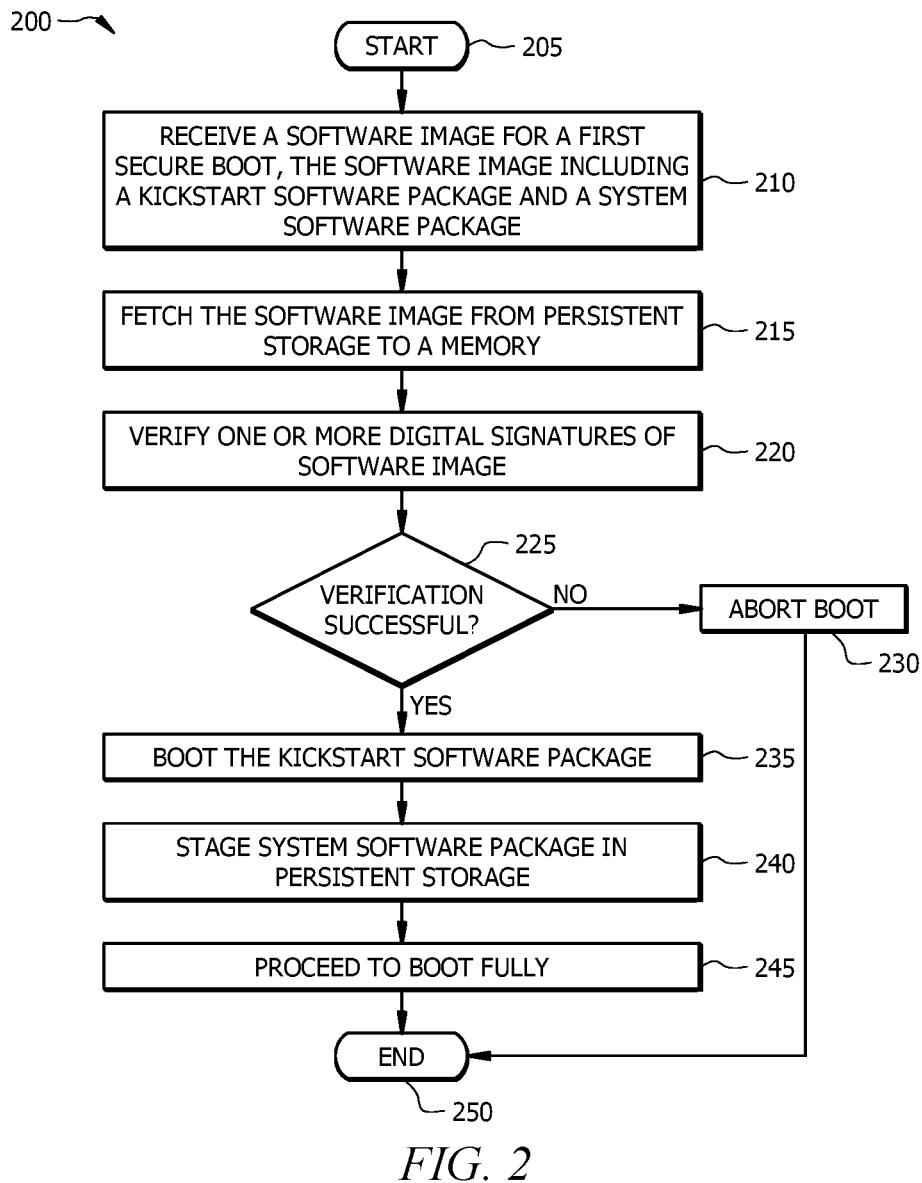
FIG. 2 illustrates a flow diagram of a method for reducing the secure boot time of a software image at first secure boot, in accordance with certain embodiments.
Figure 3:
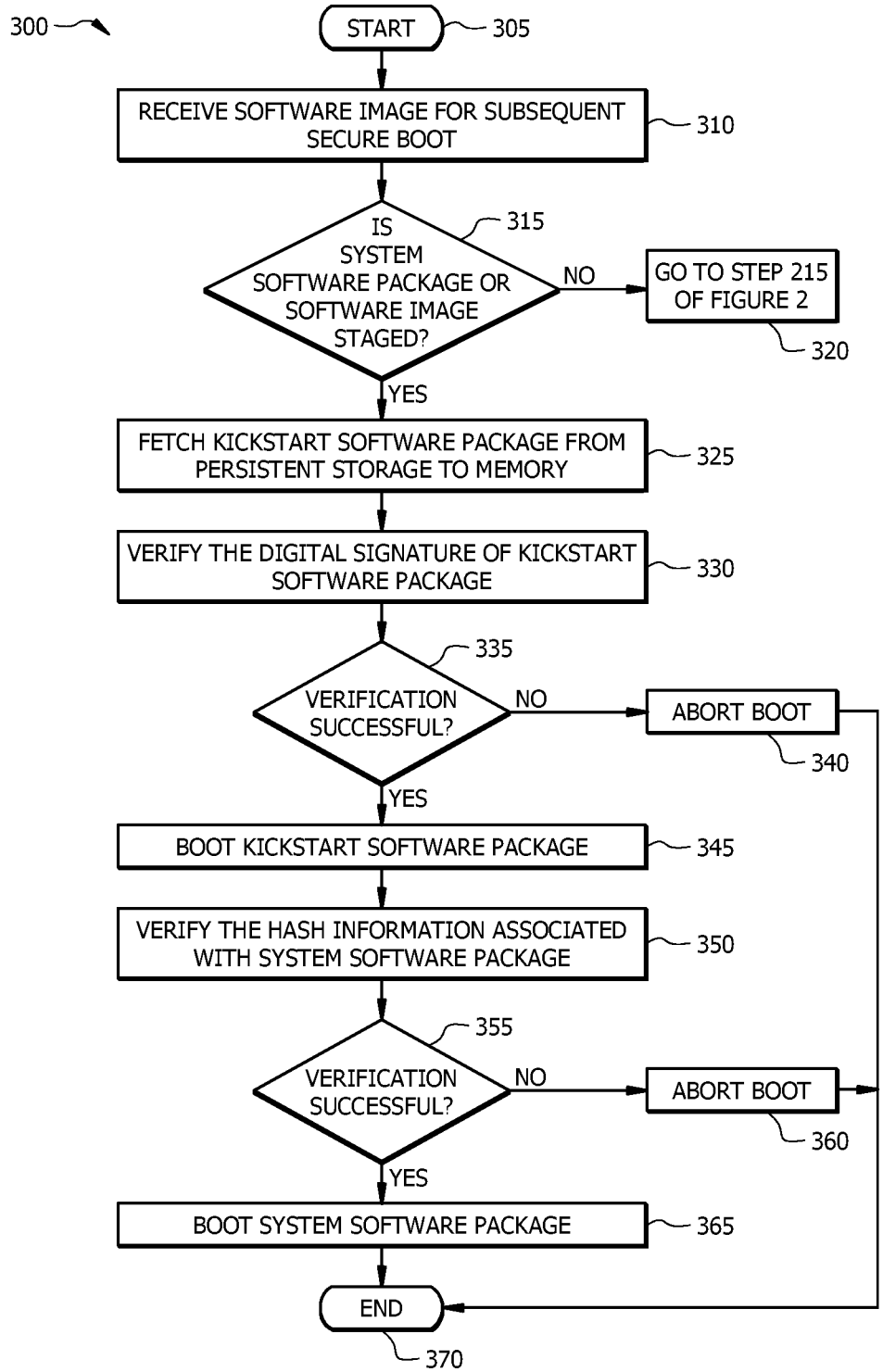
FIG. 3 illustrates a flow diagram of a method for reducing the secure boot time of a software image at a subsequent secure boot, in accordance with certain embodiments.

Reference is now made to FIGS. 2 and 3, wherein are shown methods 200 and 300 for reducing the secure boot time of a software image. The method 200 of FIG. 2 relates to a secure boot process when a software image is booted for the first time, and the method 300 of FIG. 3 relates to a secure boot process when the same software image is booted a subsequent time. In an embodiment, the software image may comprise a bootable NOS software image and may comprise a kickstart software package and a system software package, as described above in conjunction with FIG. 1. The kickstart software package may be a smaller package comprising only a fraction of the whole software image and the system software package may be a larger package comprising the bulk of the software image. In an embodiment, the system software package may further comprise a plurality of component packages. During the building of the software image, hash information (such as a cryptographic hash tree in accordance with asymmetric cryptography) of the system software package may be computed, signed and embedded inside the software image. In an embodiment, the signed hash information may be stored inside a header of the kickstart software package and/or a header system software package, and may be used for verification purposes at subsequent boots of the software image. Moreover, the entire software image may be digitally signed, and each individual component package may also include a digital signature.

The method 200 of FIG. 2 may begin at step 205. At step 210, the software image may be identified for a first secure boot. The software image comprising a kickstart software package and a system software package may be stored in a persistent storage location. Persistent storage may constitute, by way of example, an embedded Multi Media Controller (eMMC) memory, a hard drive, a USB flash memory, or any other persistent storage device known in the art. Persistent storage may include one or more partitions, including a bootflash partition and an ISO package partition. The bootflash partition of the persistent storage may be used to initially store a software image that is to be securely booted. The ISO package partition may be used to store and/or stage the system software package. The ISO package partition may be set up as a device mapper (DM) verity target partition. In an embodiment, the ISO package partition may further be partitioned into sub-partitions.

At step 215, the entire software image may be fetched from persistent storage to a memory. In other words, the entire software image may be moved from persistent storage to memory. In an embodiment, the memory may comprise a Random Access Memory (RAM), such as Synchronous Dynamic Random Access Memory (SDRAM), Double Data Rate 4 Synchronous Dynamic Random-Access Memory (DDR4-SDRAM), or any other type of memory known in the art.

At step 220, one or more digitals signature of the entire software image may be verified to confirm the validity of the software image. At step 225, a determination may be made as to whether the software image is successfully verified. If, at step 225, the verification is not successful, the method may proceed to step 230, wherein the secure boot is aborted. Then, the method may end at step 250. If, however, at step 225, the verification is successful, the method may proceed to step 235 and the kickstart software package of the software image may boot.

Then, at step 240, the system software package of the software image may be staged on the ISO package partition in the persistent storage. The step of staging may include the following steps. First, the system software package (or the plurality of component packages that make up the system software package) may be copied from memory to the ISO package partition of the persistent storage. Next, a filename associated with the software image may be written in a non-volatile memory location. The filename may serve to indicate upon subsequent boots that the system software package of this software image has been successfully staged. In an embodiment, the filename may be written in a Serial Peripheral Interface (SPI) flash. In another embodiment, the filename may be written into the persistent storage. Finally, the hash information that was stored in the header of the kickstart software package and/or the header of the system software package may be copied and stored in the ISO package partition. This may ensure that on subsequent boots, the system software package may be directly accessed with a cryptographic guarantee that any modifications may be detected without requirement of a full verification.

After the system software package is staged, the method may proceed to step 245, wherein the software image proceeds to boot fully, i.e., by booting the system software package. The method may end at step 250.

Reference is now made to FIG. 3, wherein method 300 depicts a secure boot process of the software image when it is booted a subsequent time. In other words, the method 300 of FIG. 3 may follow the method 200 of FIG. 2. The method 300 may begin at step 305. At step 310, the software image may be identified for a subsequent secure boot. The software image may be stored in the ISO package partition of the persistent storage location. At step 315, a determination may be made as to whether the system software package of the software image staged in the persistent storage by looking-up the filename associated with the software image. In an embodiment, the filename may be stored in a non-volatile memory location. In other embodiments, the filename may be stored in persistent storage. If, at step 315, it is determined that the system software package is not staged (i.e., a filename corresponding to the software image is not found), the method may proceed to step 215 of FIG. 2, wherein the entire software image may be fetched from persistent storage to memory. However, if at step 315 it is determined that the system software package is staged (i.e., a filename corresponding to the software image is found), the method may proceed to step 325, wherein only the kickstart software package is fetched from persistent storage to memory.

At step 330, the digital signature of the kickstart software package may be verified. At step 335, a determination may be made as to whether the verification of the digital signature of the kickstart software package is successful. If, at step 335, verification is not successful, the method may proceed to step 340, wherein the secure boot may be aborted and the method may end at step 370. If, however, as step 335, verification is successful, the method may proceed to step 345, wherein the kickstart software package may be booted.

At step 350, the hash information associated with the system software package staged on the ISO package partition may be verified. Because the software image was fully verified at the first boot (see step 220 of FIG. 2), this subsequent verification of the system software package 146 may simply include verifying the hash information, which as discussed above in conjunction with FIG. 2, is stored on the ISO package partition. Specifically, hash information may be verified using a root hash sum of the hash information, based on methods of asymmetric cryptography, as known in the art. Because the subsequent cryptographic verification does not require full verification of the software image, the verification may be termed "amortized", as only section(s) of the software image are required to be verified at a time. At step 355, a determination is made as to whether the verification of the hash information was successful. If, at step 355, the verification of the hash information was not successful, the method may proceed to step 360, wherein the secure boot may be aborted and the method may end at step 370. If, however, at step 355, the verification of the hash information is successful, the method may proceed to step 365, wherein the software image may proceed to boot fully by booting the system software package. In order to boot fully, a running context for the system software package may first be established using a device mapper. The device mapper may use the verified hash information and/or root hash to map information such as start locations, block sizes used, etc. of the staged system software package. Once this is complete, the system software package may boot. At step 370, the method may end.

In sum, the systems and methods of the present disclosure may allow for the pre-staging of one or more sections of a software image, such as a network operating system software image, so that upon subsequent boots, the system may avoid the time-consuming process of moving the large and bulky packages of the software image from persistent storage into the memory, and then back onto the persistent storage again, thereby reducing the overall secure boot time. In some embodiments, the overall secure boot time may be reduced by approximately 42 seconds.

The systems and methods of the present disclosure may be beneficial in other uses. For example, the kickstart software package of the software image is usually stable in size, i.e., it does not grow much over time. However, the system software package may grow over time as more features are developed. The present disclosure may allow for the boot times of the subsequent secure boots of the software image to remain roughly the same even though the overall image size may increase.

Figure 4:
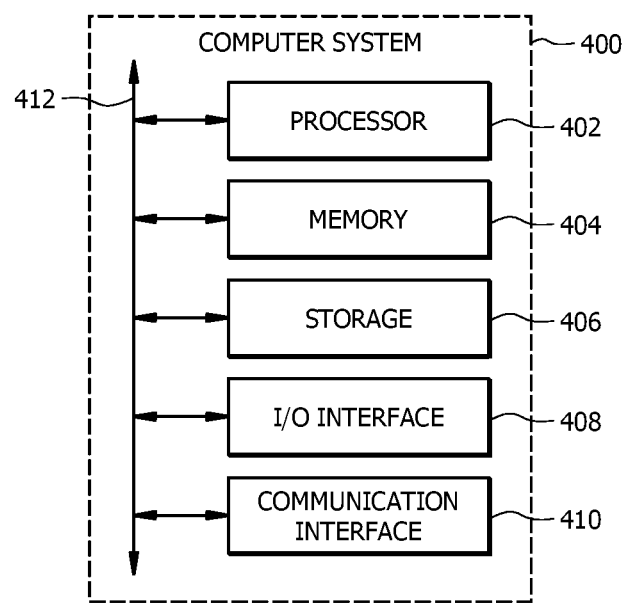
FIG. 4 illustrates a computer system, in accordance with certain embodiments.

Reference is now made to FIG. 4, wherein is shown an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the disclosure are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system, comprising:
one or more processors; and
one or more computer-readable non-transitory storage media comprising instructions that, when executed by the one or more processors, cause one or more components of the system to perform operations comprising:
identifying a software image for a first secure boot, the software image stored in a persistent storage and comprising a kickstart software package and a system software package;
fetching the software image, including the kickstart software package and the system software package, from the persistent storage to a memory;
verifying one or more digital signatures associated with the software image;
booting the kickstart software package of the software image from the memory;
staging the system software package in the persistent storage;
identifying the software image for a subsequent secure boot;
determining, based on a look-up of a filename associated with the software image, that the system software package of the software image is staged in the persistent storage;
fetching the kickstart software package from the persistent storage;
verifying a digital signature of the kickstart software package;
booting the kickstart software package;
verifying hash information associated with the system software package; and
booting the system software package from the persistent storage.

2. The system of claim 1, wherein the operation of staging comprises:
transferring the system software package from the memory to a partition in the persistent storage; and
writing the filename associated with the software image in a non-volatile memory.

3. The system of claim 2, the operations further comprising:
storing the hash information associated with the system software package in the partition of the persistent storage.

4. The system of claim 1, wherein the hash information is verified using asymmetric cryptography.

5. The system of claim 1, the operations further comprising:
creating a device mapper to establish a running context using the verified hash information associated with the system software package.

6. A method, comprising:
identifying a software image for a first secure boot, the software image stored in a persistent storage and comprising a kickstart software package and a system software package;
fetching the software image, including the kickstart software package and the system software package, from the persistent storage to a memory;
verifying one or more digital signatures associated with the software image;
booting the kickstart software package of the software image from the memory;
staging the system software package in the persistent storage;
identifying the software image for a subsequent secure boot;
determining, based on a look-up of a filename associated with the software image, that the system software package of the software image is staged in the persistent storage;
fetching the kickstart software package from the persistent storage;
verifying a digital signature of the kickstart software package;
booting the kickstart software package;
verifying hash information associated with the system software package; and
booting the system software package from the persistent storage.

7. The method of claim 6, the step of staging comprising:
transferring the system software package from the memory to a partition in the persistent storage; and
writing the filename associated with the software image in a non-volatile memory.

8. The method of claim 7, further comprising:
storing the hash information associated with the system software package in the partition of the persistent storage.

9. The method of claim 6, wherein the hash information is verified using asymmetric cryptography.

10. The method of claim 6, further comprising:
creating a device mapper to establish a running context using the verified hash information associated with the system software package.

11. One or more computer-readable non-transitory storage media embodying instructions that, when executed by a processor, cause performance of operations comprising:
identifying a software image for a first secure boot, the software image stored in a persistent storage and comprising a kickstart software package and a system software package;
fetching the software image, including the kickstart software package and the system software package, from the persistent storage to a memory;
verifying one or more digital signatures associated with the software image;
booting the kickstart software package of the software image from the memory;
staging the system software package in the persistent storage;
identifying the software image for a subsequent secure boot;
determining, based on a look-up of a filename associated with the software image, that the system software package of the software image is staged in the persistent storage;
fetching the kickstart software package from the persistent storage;
verifying a digital signature of the kickstart software package;
booting the kickstart software package;
verifying hash information associated with the system software package; and
booting the system software package from the persistent storage.

12. The one or more computer-readable non-transitory storage media of claim 11, wherein the operation of staging comprises:
transferring the system software package from the memory to a partition in the persistent storage; and writing the filename associated with the software image in a non-volatile memory.

13. The one or more computer-readable non-transitory storage media of claim 12, the operations further comprising:
   storing the hash information associated with the system software package in the partition of the persistent storage.

14. The one or more computer-readable non-transitory storage media of claim 11, wherein the hash information is verified using asymmetric cryptography.

* * * * *